3,306,823
SOMATOTROPIC HORMONE
Jean Choay, Neuilly, and Maurice Thely and Edmond Vairel, Paris, France, assignors to "Laboratoire Choay," Paris, France, a corporation of France
No Drawing. Filed Jan. 18, 1963, Ser. No. 252,286
Claims priority application France, Jan. 22, 1962, 885,443, Patent 1,320,784
6 Claims. (Cl. 167—74)

The present invention relates to a process for the preparation of substances biologically active in man from protides of animal origin. More particularly, it has as an object a process for the preparation of substances biologically active in man from protidic animal hormones, such as hormones of the hypophysis or pituitary type and, particularly, the somatotropic hormone secreted by the ante-hypophysis.

The studies on the activity of animal hormones of the hypophysis-type and particularly on the activity in man of the somatotropic hormone of bovine origin, have indicated that these hormones and particularly the last one mentioned, were not active or only very slightly active in man.

Consequently there has been considerable interest in rendering the bovine somatotpropic hormone biologically active in man. These previous investigations included subjecting the somatotropic hormone of bovine origin to the action of proteolytic enzymes of the alpha-chymotrypsin type which causes a partial hydrolysis of the hormone. This partial hydrolysis gives rise to a substance that, upon being introduced in man, exhibits biological properties analogous to those of the somatotropic hormone of human origin.

However, the above-referred to process has serious drawbacks that have prevented its application on an industrial scale, for the reason that the biological properties in man of the products obtained thereby were not uniform. In fact, upon subjecting the somatotropic hormone of bovine origin to the action of enzymes, in accordance with the known process, the hydrolysis is partial to the extent that it is arrested by physical means such as congelation and then lyophilization. However, such a termination of the hydrolysis is reversible in that the contacting with an aqueous medium, before or after administration, of the substance that results from the hydrolysis of the hormone by the enzymatic action, reestablishes the favorable conditions at the initiation of the enzymatic action of the enzyme on its substrate and, consequently, influences the course of the hydrolysis of the molecule of the hormone of bovine origin, hydrolysis which in some respects, if not total, can at least determine a partial or total loss of the desired biological activity. It follows that the inconsistencies and variations of the biological properties of the substances obtained by the known process, are due to the fact that this process does not provide means capable of controlling the hydrolysis which results from the action of the enzyme on the somatotropic hormone.

The present invention has as an object the provision of a process for the preparation of substances that are biologically active in man, from protides of animal origin, particularly protidic hormones of animal origin, for example animal hormones of the hypophysis-type and, more especially, of the somatotropic hormone, which is better suited to the requirements of practice than the processes presently used for the same purpose. The reason for this is that the process according to the present invention permits instantaneous arresting, in an irreversible fashion, the action of the enzyme on the protide or on the protidic hormone of animal origin that is subjected to this action, in such a way that the hydrolysis of the protide or of the hormone treated does not proceed beyond the desired stage.

The main object of the invention is that of furnishing a process for the preparation of substances that are biologically active in man from protides of animal origin, particularly animal hormones of the hypophysis-type, that are per se not directly active in man, such as the somatotropic hormone, by hydrolysis of said protides or hormones with the aid of suitable proteolytic enzymes, which process is characterized in that it features a controlled inhibition of the enzymatic action on said protides or hormones with the aid of suitable inhibitors in order to stop the hydrolysis thereof in irreversible fashion at the desired stage.

The inhibitor forms with the enzyme a complex that causes the inactivation of the enzyme, which has the effect of determining the irreversible stopping of the hydrolysis of the protide or hormone molecule treated. As a result of this, the substance obtained by the process according to the present invention is uniform and stable, from the time it is put into solution as well as at the moment it is injected into the organism. This irreversible termination of the enzymatic activity insures that there is not produced at any time a recurrence of the activity of the enzyme on its substrate and, as a result, a loss of activity of the substance obtained. For all practical purposes, then, the product obtained is substantially free of enzymatic activity.

In the broadest aspect the process according to the present invention utilizes any inhibitor or group of inhibitors which is capable of inhibiting the enzyme that effects the hydrolysis of the protide or hormone being treated. Such inhibitors include chemical inhibitors such as the diisofluorophosphates or natural inhibitors that may be either of vegetable origin (for example lima bean, soy bean inhibitors) or of animal origin (for example, ovomucoids, peptidase inhibitors extracted from pancreas, parotides, ascaris). It will be apparent that the above listing of compounds is intended to be illustrative only and that it does not in any way limit the scope of the invention.

The inhibitor/enzyme complex may, if desired, be separated or not separated from the substance obtained by operating the process according to the present invention, provided that its presence does not alter in any way the biological properties of the substance obtained, nor the aptitude of the latter to react, in the course of a reaction, or other subsequent chemical operations.

In accordance with a particular embodiment of the invention, a hormone such as a somatotropic hormone of animal origin, more particularly of bovine origin, upon being subjected preliminarily to the action of an enzyme such as alpha-chymotrypsin which effects the hydrolysis of said hormone, is then subjected to a treatment for the inhibition of the enzymatic action of the alpha-chymotrypsin, at any desired stage of said action, by the introduction of an inhibitor of alpha-chymotrypsin, such as a diisofluorophosphate or, for example, the inhibitor extracted from lima bean, the peptidase inhibitor extracted from pancreas, parotides, ascaris and the like.

In addition to the foregoing procedure, the invention comprises other modifications of procedure which will be apparent from the following description.

The invention is particularly directed to processes for the preparation of substances that are biologically active in man from protides of animal origin, particularly from animal protidic hormones, such as hormones of the hypophysis-type and, more particularly, the animal somatotropic hormone, in accordance with the present invention, as well as the elements contributing to the realization and practice of such processes and the overall processes in which are included the aforesaid processes for the preparation of substances that are biologically active in man, from protides of animal origin such as animal protidic hormones.

The invention will be further understood by the description that follows in which are included examples of the process for the production of substances that are biologically active in man from protides such an animal protidic hormones that are not directly active in man, particularly animal hormones of the hypophysis-type and, more particularly, the somatotropic hormone.

It is understood that the following examples are given by way of illustration and that the invention is not limited thereto.

EXAMPLE I 2 gr. (40,000 u.) of a somatotropic hormone of bovine origin, titering 20 u. Evans per mgr. (unit defined with respect to 100 gr. hypophysectomized rat) are dissolved in 95 ml. of distilled water-sodium bicarbonate solution of pH 8 at 25° C. 4 mg. of alpha-chymotrypsin are dissolved in 5 ml. of distilled water-sodium bicarbonate solution of pH 8 at 25° C. The two solutions are mixed and maintained at 25° C. for 30 minutes while constantly agitating. There is then added sufficient inhibitor in the form of peptidase extracted from beef pancreas, to inactivate the alpha-chymotrypsin utilized for effecting the enzymatic hydrolysis. In the present case this will amount to 3 mgr. of crystallized inhibitor. The preparation is thereafter lyophilized. The substance obtained contains 24,000 u. Evans; the yield is 60%.

EXAMPLE II 2 gr. (40,000 u.) of a somatotropic hormone of bovine origin, titering 20 u. Evans per mgr. (unit defined with respect to 100 gr. hypophysectomized rat) are dissolved in 95 ml. of distilled water-sodium bicarbonate solution of pH 8 at 25° C. 4 mg. of alpha-chymotrypsin are dissolved in 4 ml. of distilled water-sodium solution of pH 8 at 25° C. The two solutions are mixed and maintained at 25° C. for 30 minutes while constantly agitating.

There is then added sufficient inhibitor in the form of peptidase extracted from beef parotids to inactivate the alpha-chymotrypsin utilized for effecting the enzymatic hydrolysis. In the present case this will amount to 12 mgr. of inhibitor. The preparation is thereafter lyophilized. The substance obtained contains 24,000 u. Evans; the yield is 60%.

EXAMPLE III 2 gr. (40,000 u.) of a somatotropic hormone of bovine origin, titering 20 u. Evans per mgr. (unit defined with respect to 100 gr. hypophysectomized rat) are dissolved in 95 ml. of distilled water-sodium bicarbonate solution of pH 8 at 25° C. 4 mgr. of alpha-chymotrypsin are dissolved in 5 ml. of distilled water-sodium bicarbonate solution of pH 8 at 25° C. The two solutions are mixed and maintained at 25° C. for 30 minutes while constantly agitating.

There is then added a sufficient quantity of an inhibitor extracted from lima beans, to inactivate the alpha-chymotrypsin utilized for effecting the enzymatic hydrolysis. In the present case this will amount to 10 mgr. of crystallized inhibitor. The preparation is thereafter lyophilized. The substance contained 15,000 u. Evans; the yield is 37.5%. The differences in the yield and titer observed in this case are probably due to the insufficient solubility of the inhibitor extracted from lima means, under the operating conditions.

From the foregoing examples it will be understood that regardless of the modification applied to the operating procedure, there is obtained a process for the preparation of substances that are biologically active in man from protides of animal origin, particularly from protidic hormones and, more particularly, from animal hormones of the hypophysis-type that are not per se directly active in man, such as somatotropic hormones the characteristics of which have been sufficiently set forth hereinabove and, therefore, need not be further elaborated.

The process for the preparation of substances that are biologically active in man and are deprived of enzymatic activity, from protides of animal origin, particularly from animal protidic hormones and, more particularly, the hormones of the hypophysis-type, such as the somatotropic hormone, presents a distinct advantage over the previously known process used for achieving the same object, i.e. that of permitting the obtaining of substances wherein the biological properties remain constant and are not altered by the introduction of an inhibitor of the enzymatic action to which hormones are subjected.

From the foregoing it will be understood that the invention is not limited to the specific details of certain embodiments thereof which are intended to be illustrative only. Any modification of or variation therefrom which conforms to the spirit of the invention is intended to be included within the scope of the claims.

What is claimed is:

1. The process for the preparation of a stable somatotropic hormone having activity on human beings comprising subjecting animal somatotropic hormone having no activity on human beings to the enzymatic action of alpha-chymotrypsin and permanently arresting the enzyme action by adding to the reaction mixture a non-toxic alpha-chymotrypsin enzyme inhibitor of vegetable origin at such time that the hormone has activity on human beings.

2. The therapeutic product produced by the process of claim 1.

3. A process comprising injecting into a human the composition of claim 2 to produce a somatotropic effect in said human.

4. The process for the preparation of a stable somatotropic hormone having activity on human beings comprising subjecting animal somatotropic hormone having no activity on human beings to the enzymatic action of alpha-chymotrypsin and permanently arresting the enzyme action by adding to the reaction mixture a non-toxic alpha-chymotrypsin enzyme inhibitor of animal origin at such time that the hormone has activity on human beings.

5. The therapeutic product produced by the process of claim 4.

6. A process comprising injecting into a human the composition of claim 5 to produce a somatotropic effect in said human.

References Cited by the Examiner

UNITED STATES PATENTS 2,734,015   2/1956   Wettstein _____ 167—74

OTHER REFERENCES

Forsham et al., Metabolism, 1958, pages 762–764.
Li, The Journal of Biological Chemistry, vol. 218, January 1956, pages 41–52.

JULIAN S. LEVITT, *Primary Examiner.*

FRANK CACCIAPAGLIA, JR., S. ROSEN, *Examiners.*